Sept. 15, 1970  W. A. BEDFORD, JR  3,528,637

CORE SET FOR MOLDING A PARTIAL THREAD

Original Filed Aug. 24, 1965

INVENTOR
WILLIAM A. BEDFORD JR
BY
ATTORNEYS

United States Patent Office 3,528,637
Patented Sept. 15, 1970

1

3,528,637
CORE SET FOR MOLDING A PARTIAL THREAD
William A. Bedford, Jr., Sarasota, Fla., assignor, by mesne assignments, to Microdot Inc., New York, N.Y., a corporation of California
Original application Aug. 24, 1965, Ser. No. 482,050, now Patent No. 3,361,174, dated Jan. 2, 1968. Divided and this application Aug. 22, 1967, Ser. No. 662,555
Int. Cl. B29d 1/00
U.S. Cl. 249—59                                4 Claims

ABSTRACT OF THE DISCLOSURE

The disclosure relates to a core set for molding an aperture having a threaded portion and an unthreaded portion in an article into which aperture a threaded fastener is insertable.

SUMMARY OF THE INVENTION

The present application is a division of Pat. No. 3,361,174, issued Jan. 2, 1968.

In the manufacture of many articles by a molding process, such as by injection molding of plastic or by die casting of metal, it is desirable to provide one or more threaded apertures in the device to enable it to be used to attach some other article to the molded device.

For example, in the molding of various types of knobs, an aperture is provided in the rear of the knob to enable it to be attached to a bolt or threaded rod. The knob aperture heretofore has been provided with threads by a separate tapping operation subsequent to molding, or a threaded metal insert may be inserted into the molded aperture by a subsequent assembly operation. A similar procedure is followed in the case of a large molded article, such as a television or radio cabinet, which must be provided with a plurality of molded apertures to permit the attachment of various electrical or mechanical components.

The threading of such apertures in a separate operation after molding adds to the expense of the finished product, particularly in the case of certain plastic materials in which it is difficult to form adequate threads by tapping. Threads so formed are generally weaker and less satisfactory than desired.

The assembly of a threaded metal insert into such a molded aperture provides better means for receiving a threaded member, but adds to the cost of the finished product not only the cost of the assembly operation but also the cost of the insert itself.

Threaded apertures have been molded directly in some instances by the use of a threaded core pin which is collapsable to permit its removal, or by the use of a rotatable core pin which can be unscrewed from the molded opening. The first of these methods can be used only with apertures of relatively large size, since smaller apertures require the use of core pins so small that they are impossible to form by ordinary machining methods, and have insufficient strength to resist the forces of the molding process. The second of the above mentioned methods requires the use of complicated mold machinery to rotate the core, which is not available on many types of molding apparatus.

The object of this invention is to provide a core set for molding an article having an aperture for receiving a threaded member in which threads are provided in only a portion of the aperture wall.

A further object of the invention is to provide a core set for molding an article having an aperture with a wall having threads formed in one portion thereof with the opposing portion being unthreaded.

A further object of the invention is to provide a core

2 set for producing an article having an aperture for receiving a threaded member in which threads are provided around about one-half of the aperture wall, with the opposing portion of the wall being unthreaded and being shaped and positioned to permit lateral retraction of threaded portion of core to engage only a small portion of the periphery of an inserted threaded member.

A further object of the invention is to provide a core set which practices the method of molding a device having an aperture adapted to receive a threaded member which can be accomplished in ordinary molding apparatus without the use of special equipment.

A further object of the invention is to provide a molding apparatus comprising a core set assembly adapted to form during the molding of a device an aperture to receive a threaded member which is readily adapted for use with ordinary molding apparatus.

Other objects of the invention will be apparent to one skilled in the art from the following detailed description of a specific embodiment thereof.

DETAILED DESCRIPTION

Figure 1:
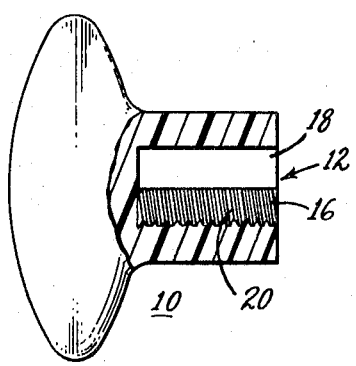
FIG. 1 is a view in side elevation, partly in section, of an article having an aperture formed therein in accordance with the teachings of the invention for receiving a threaded member.
Figure 2:
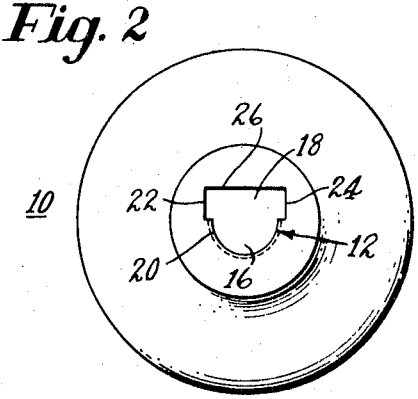
FIG. 2 is a view of the article of FIG. 1 as seen from the right side.
Figure 3:
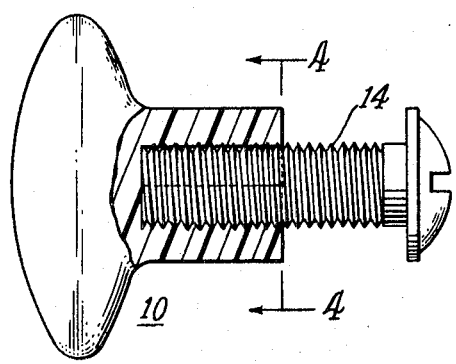
FIG. 3 is a view of the article similar to FIG. 1, with a threaded member assembled therein.
Figure 4:
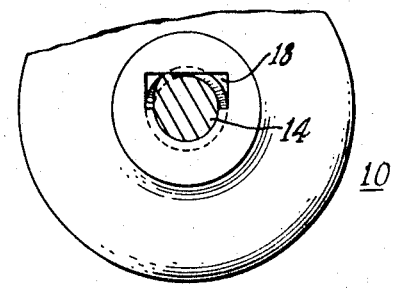
FIG. 4 is a view in section taken on line 4—4 of FIG. 3.

Referring to the drawing, there is illustrated a molded article such as a knob 10 which is provided with an aperture 12 which is adapted to receive a threaded member 14. The aperture 12, which is formed during the molding of the knob 10 by apparatus to be described hereinafter, comprises a semi-cylindrical portion 16 and an adjoining portion 18 which, in the illustrated embodiment is generally rectangular. The illustrated shape of the portion 18 is by way of example only, since other shapes may be used, as will appear hereinafter.

The semi-cylindrical portion 16 is provided with threads 20 in the wall surface thereof, said threads in the illustrated embodiment extending throughout substantially 180° of circumference and terminating at the intersection with the vertical edges 22 and 24 of the rectangular portion 18.

In the illustrated embodiment the rectangular portion has a width, measured between the vertical edges 22 and 24, which is substantially equal to the major diameter of the threads 20 formed in the portion 16, and has a height of one-half the major diameter. In the illustrated embodiment the term height refers to the distance from the top wall 26 of the rectangular portion to a line joining the points at which the side edges 22 and 24 intersect the rectangular portion 18. In other words, the distance from the root of the threads at the center of the portion 16 to the opposite wall 26 is substantially equal to the major diameter of the screw to be assembled therein, with variations to be discussed hereinafter.

Figure 5:
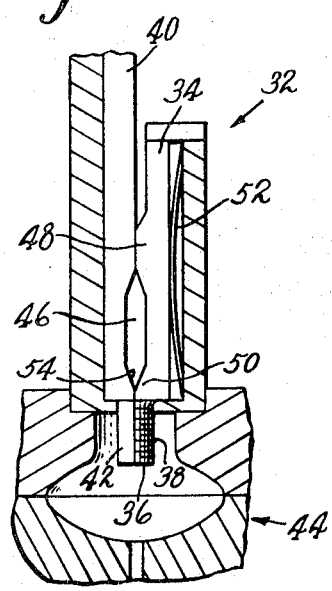
FIG. 5 is a view in section of a core pin assembly positioned in relation to a mold for forming the article of FIGS. 1 and 2.
Figures 6, 7:
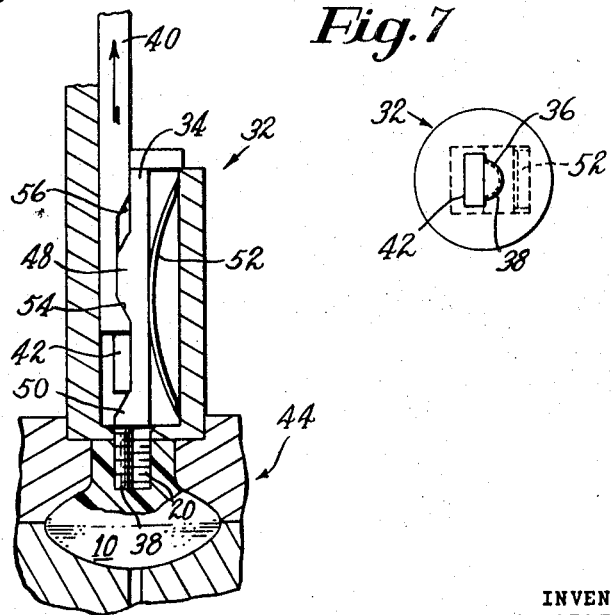
FIG. 6 is a view of the core pin assembly of FIG. 5 illustrating the method of removing the core pin assembly from the molded article.
FIG. 7 is a view in section taken on line 7—7 of FIG. 5.

Referring to FIGS. 5–7 there is illustrated a core assembly 32 which is adapted for use in forming the aperture 12 when the article 10 is molded. The assembly 32 comprises a first portion having a support rod 34 with a projecting core piece 36 on the end thereof which is generally semi-cylindrical in cross-section with threads 38 formed on the curved surface, and a second portion comprising a support rod 40 having a projecting core piece 42 on the end which is generally rectangular. The core pieces 36 and 42 are shaped to form the portions 16 and 18 of the aperture 12 when the article 10 is molded, and for this purpose the support rods are arranged to position the core pieces alongside each other in a molding die 44 as illustrated in FIGS. 5 and 6, and to retract them from the article after molding in a manner now to be described.

After the material of which the article 10 is to be formed is injected or otherwise deposited in the mold cavity and has solidified, the core pieces cannot be removed by a direct outward movement because of the engagement of the threads 38 on the core pin with the threads 20 on the molded article. Hence the core piece 36 must be shifted laterally far enough to permit the threads thereon to clear the threads on the molded article. To permit such lateral shifting the core piece 42 may be first retracted, since it has no undercut portions to prevent such outward movement from the aperture, and thereafter the core piece 36 may be shifted sideways far enough to permit retraction thereof.

Although separate mechanism (not shown) may be provided in the molding apparatus to retract said core pieces independently in the proper sequence, the illustrated embodiment of the invention discloses means to cause the threaded core piece 36 to move laterally and to be withdrawn by the rearward movement of the rectangular core piece after said rectangular core piece has been retracted a sufficient distance. For this purpose the support rod 40 of the rectangular core piece is provided with a recess 46 and the support rod 34 of the threaded core piece is provided with a first protruding portion 48 spaced upwardly from the core piece 36, and a second protruding portion 50 is disposed just above the core piece 36. The support rod 34 is biased toward the support rod 40 by means of a spring 52, so that when the support rod 40 is retracted, the protruding portion 48 moves into the recess 46 thereby permitting the necessary sideways movement of the core piece 36 to allow the threads 38 on the core piece 36 to become disengaged from the threads on the molded part. Further retraction of the support rod 40 causes retraction of the rod 34 by engagement of the surface 54 of the lower end of the recess with the lower end of the protruding portion 48. To prepare the core pieces for the next molding cycle, the support rod 40 is moved back to its original position after the molded article has been removed, and the support rod 34 is also moved back automatically by the camming action of the surface 56 at the upper end of the recess 46 on the upper end of the protruding portion 48.

One of the advantages of the illustrated form of bolt engaging means over a tapped hole is the fact that a friction lock effect can easily be provided, where as such effect is difficult or impossible to provide in a tapped hole. Although a hole may be tapped slightly undersize to provide a binding effect when a bolt is inserted, such a method is unreliable because of the difficulty of accurately controlling the degree of the binding effect. Only a small variation in size of the tapped aperture or in the size of the inserted threaded member will either reduce any friction lock effect to an ineffective amount or will make the insertion of the threaded member so difficult that splitting of the molded article could occur.

The structure illustrated herein permits a reliable friction lock effect to be obtained at no extra cost by making the distance from the thread root at the center of the threaded portion to the opposite wall 26 slightly less than the major diameter of the threaded member to be inserted therein, so that on insertion of said member the crests of the threads of the inserted member press into the surface of the wall 26. Since only the apex of the threads engage the wall, considerable unit pressure is developed which allows the threads to press into the wall whatever distance is necessary to accommodate minor variations in dimensions of the parts without causing excessive driving torque or splitting force. Thus the illustrated bolt engaging means permits more variation in the dimensions of the bolt threads while still providing a secure attachment.

Although in the illustrated embodiment the surface opposite the threaded portion is a flat wall, it will be understood that this is by way of example only, since for some applications said surface may be concave or convex or may comprise inwardly protruding ribs or the like.

What is claimed is:

1. In a core set for molding a partial thread on the side wall of a hole, a first core member having a partial cylindrical projecting core piece not greater than semi-cylindrical in cross-section which has sections of a thread on the curved surface thereof, and a second core member having an unthreaded projecting core piece of a width between the sides thereof substantially that of the overall diameter of said thread and a thickness such that the mid portion of the face between said sides remote from the core piece of the first core member is located between the overall diameter of said thread and the root diameter thereof.

2. In a core set as recited in claim 1, wherein the unthreaded core piece of said second core member is of rectangular cross-section.

3. In a core set in accordance with claim 1, wherein means are provided for moving said first core member laterally in said hole upon retraction of said second core member to effect disengagement of the thread sections of said first core member from the threads molded on the side wall of said hole.

4. In a core set in accordance with claim 3 wherein said first core member interlocks with said second core member to permit concomitant retraction thereof.

References Cited

UNITED STATES PATENTS

| | | |
|---|---|---|
| 35,243 | 5/1862 | Knight. |
| 500,682 | 7/1893 | Vallee et al. |
| 871,067 | 11/1907 | Rice. |
| 890,453 | 6/1908 | Rice et al. |
| 1,439,646 | 12/1922 | Smith. |
| 1,638,846 | 8/1927 | Guyot _____ 249—186 |
| 2,327,665 | 8/1943 | Peat. |
| 2,386,582 | 10/1945 | Woodward _____ 249—184 X |
| 3,067,467 | 12/1962 | Yanush. |
| 3,339,242 | 9/1967 | Lamb. |

FOREIGN PATENTS

| | | |
|---|---|---|
| 496,908 | 11/1950 | Belgium. |
| 470,653 | 6/1914 | France. |
| 73,692 | 9/1960 | France. |

J. HOWARD FLINT, Jr., Primary Examiner

U.S. Cl. X.R.

249—152, 180, 184, 186; 164—113, 132, 320, 370